(12) United States Patent
Maro et al.

(10) Patent No.: US 8,893,816 B2
(45) Date of Patent: Nov. 25, 2014

(54) IMPLEMENT FRAME WITH MAIN SECTION HELPER LIFT CYLINDERS

(75) Inventors: Randall A. Maro, Davenport, IA (US); Aaron L. Barfels, Davenport, IA (US)

(73) Assignee: Deere & Company, Moline, IL (US)

( * ) Notice: Subject to any disclaimer, the term of this patent is extended or adjusted under 35 U.S.C. 154(b) by 25 days.

(21) Appl. No.: 13/596,182

(22) Filed: Aug. 28, 2012

(65) Prior Publication Data

US 2014/0060865 A1    Mar. 6, 2014

(51) Int. Cl.
*A01B 49/00* (2006.01)
(52) U.S. Cl.
USPC ............................. 172/311; 172/456; 172/485
(58) Field of Classification Search
USPC ......... 172/310, 311, 395, 407, 421, 452, 456, 172/485
See application file for complete search history.

(56) References Cited

U.S. PATENT DOCUMENTS

| | | | | |
|---|---|---|---|---|
| 2,847,030 A | * | 8/1958 | Mcrae ....................... | 137/596.13 |
| 3,168,146 A | * | 2/1965 | Price et al. ........................ | 172/7 |
| 5,234,060 A | * | 8/1993 | Carter ........................... | 172/413 |
| 5,839,516 A | * | 11/1998 | Arnold et al. .................. | 172/456 |
| 6,401,832 B1 | * | 6/2002 | Payne et al. .................... | 172/238 |
| 7,073,604 B1 | * | 7/2006 | Dobson et al. ................. | 172/311 |
| 7,478,683 B2 | * | 1/2009 | Peck et al. ..................... | 172/456 |
| 7,497,269 B2 | | 3/2009 | Jagow | |
| 2009/0270148 A1 | * | 10/2009 | Marvin et al. ................ | 460/119 |

OTHER PUBLICATIONS

Hyco Canada—Tutorial on Cylinders, "Speed Control of Hydraulic Cylinders", Sep. 2011 from http://www.hycocanada.com.*

* cited by examiner

*Primary Examiner* — Matthew D Troutman

(57) ABSTRACT

A folding implement frame having seven sections in a use position and nine sections when folded. The frame design allows a frame having a width of greater than 27 meters to be folded into a transport position having a width of less than eight meters and a height of less than six meters. The hydraulic system transfers weight to the center frame section during folding and unfolding to enhance stability. The hydraulic system uses accumulators to minimize the amount of oil reduction in the tractor reservoir resulting from extension of the hydraulic cylinders of the implement. Implement raise and lower cycle times are minimized by a helper cylinder to lift the frame main section when the entire implement weight is on the main section and allowing a smaller cylinder to lift the frame main section in the use position for shorter cycle times to raise and lower the implement.

3 Claims, 12 Drawing Sheets

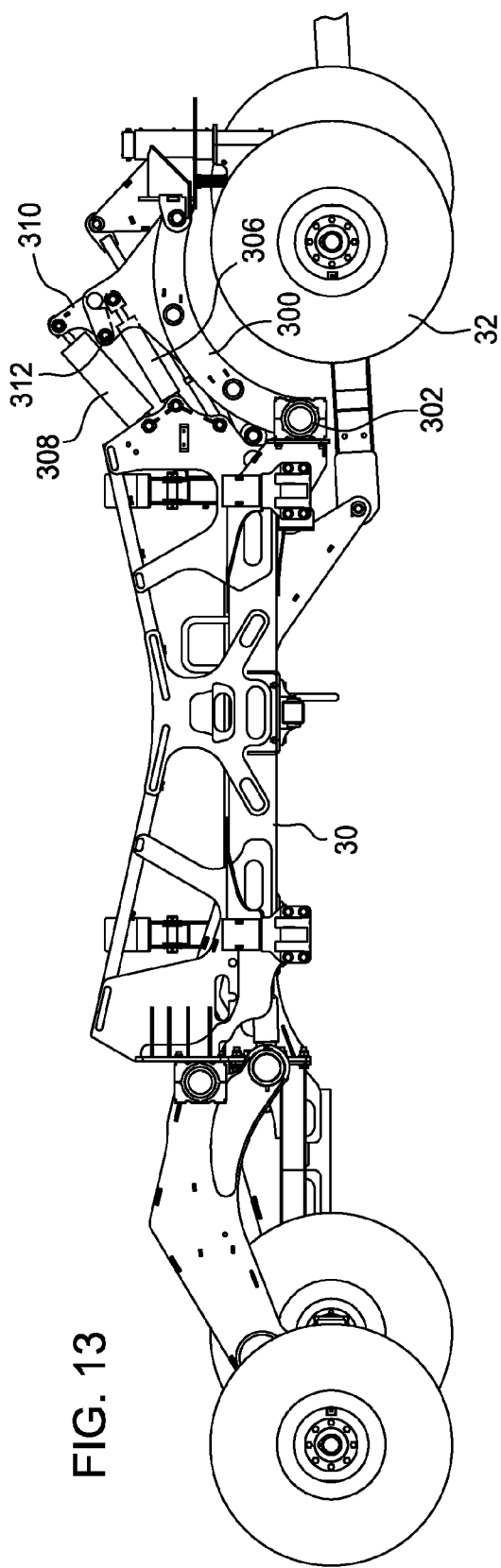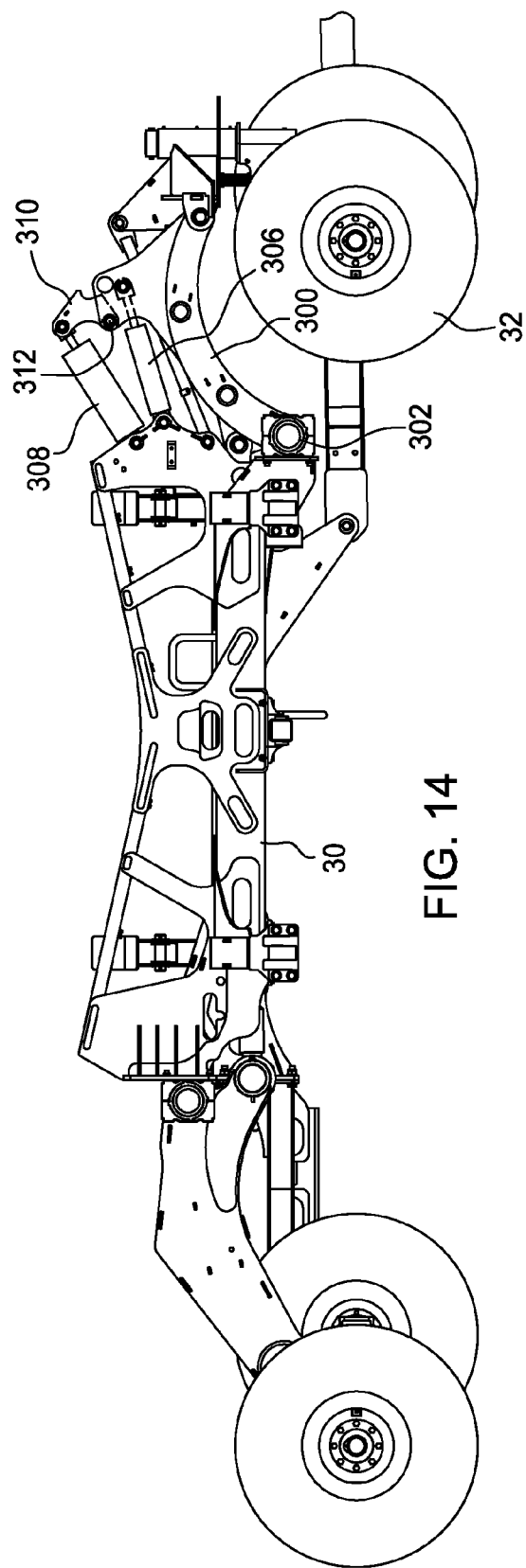

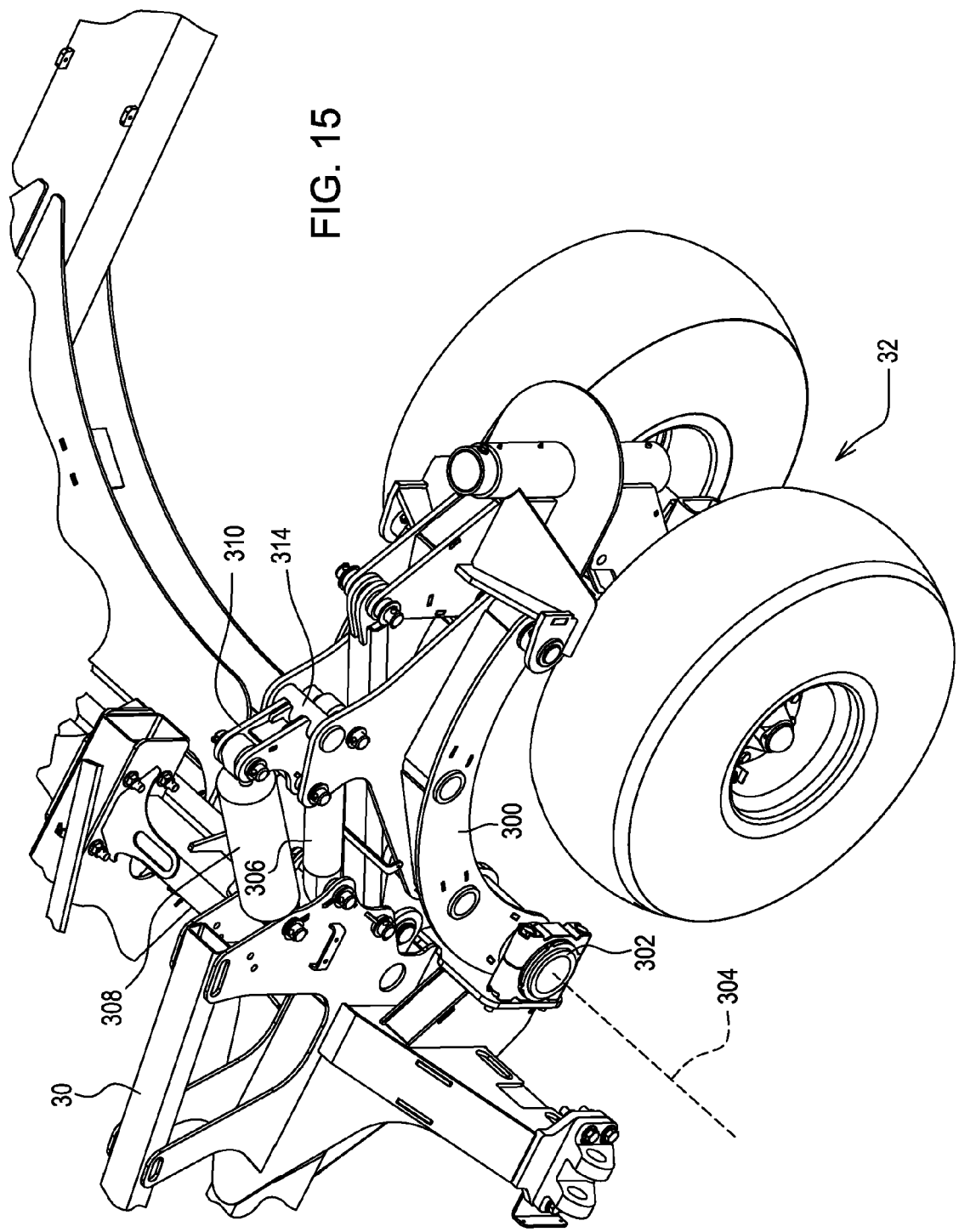

FIG. 16
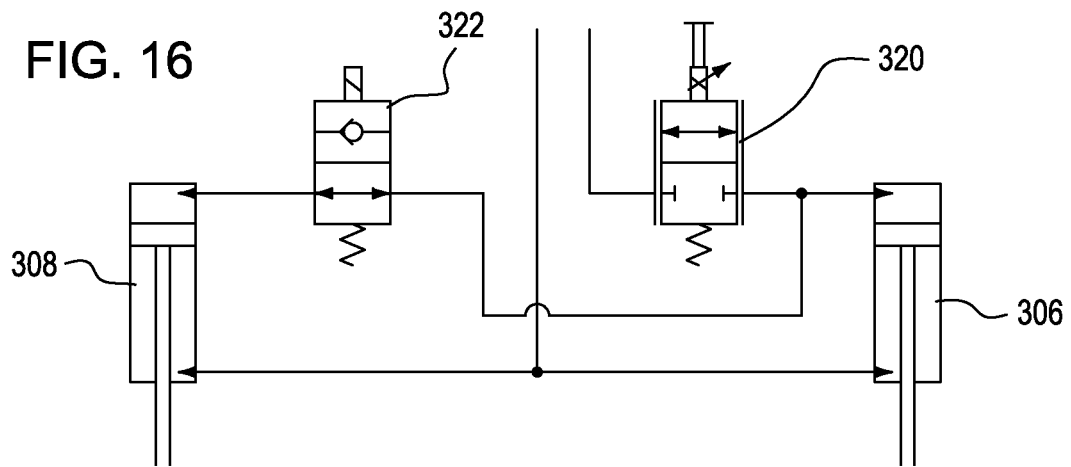
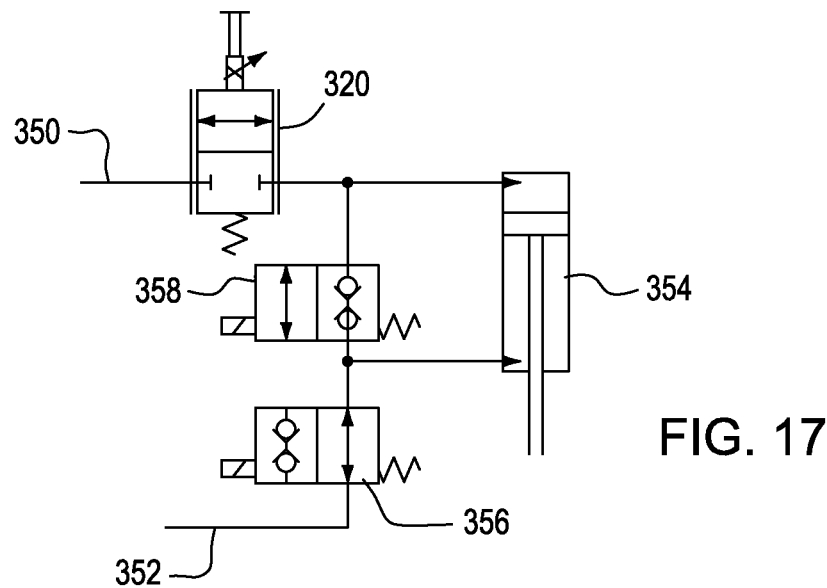
FIG. 17

IMPLEMENT FRAME WITH MAIN SECTION HELPER LIFT CYLINDERS

FIELD

An implement frame is disclosed and in particular, a frame for an agricultural implement.

BRIEF DESCRIPTION OF THE DRAWINGS

FIG. 13 is a side view of the main frame section illustrating the frame lift wheel assembly in the frame lowered position;

FIG. 14 is a side view like FIG. 13 with the frame in the raised position;

FIG. 15 is a perspective view of the main frame section lift wheel assembly illustrating the main frame helper lift cylinder; and FIG. 16 is a hydraulic schematic illustrating of the main frame helper lift cylinder circuit; and FIG. 17 is a hydraulic schematic of an alternative hydraulic circuit for the main frame lift cylinder.

DETAILED DESCRIPTION

Figure 1:
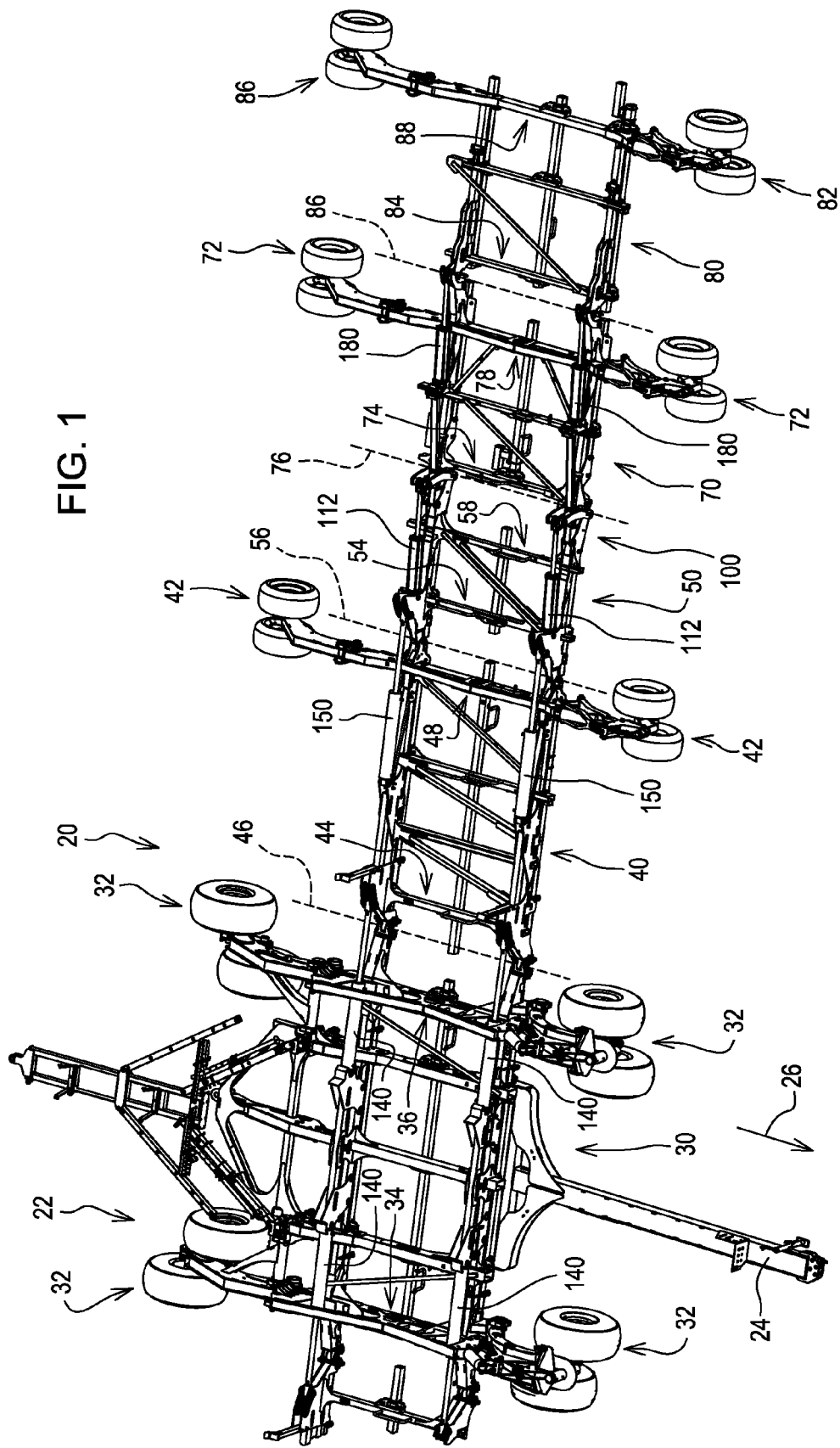
FIG. 1 is a top view of an implement frame illustrating a main section and multiple wings.

An agricultural implement 20 is shown in FIG. 1. Implement 10 is an air hoe drill for use with an air cart to plant seeds. However, the present invention can apply to any type of implement and is not limited to an air hoe drill or even to an agricultural implement. The implement 10 includes a frame 22 comprising multiple sections as described in greater detail below, a plurality of wheel assemblies and a hitch 24 to connect the implement to a prime mover such as a tractor to move the implement along the ground in a travel direction shown by the arrow 26. Implement 20 can be directly attached to a tractor or connected behind an air cart that is in turn connected to a tractor.

The frame 22 has a main or center section 30 to which the hitch 24 is connected. The main section is supported on front and rear main wheel assemblies 32. The wheel assemblies are mounted on pivot arms to enable the frame 22 to be raised and lowered relative to the ground. The frame main section has left and right sides 34 and 36 respectively relative to the travel direction.

A plurality of left and right wings extend from the center section 30. Only the right side wings are shown in FIG. 1 for purposes of clarity. The left side is a mirror image of the right side. The entire frame is shown in FIGS. 5-9. Left and right first or inner wings 40 are pivotally attached to the left and right sides of the main section at inner ends 44 of the inner wings respectively. Each inner wing is pivotal about a respective inner wing axis 46 and each inner wing has an outer end 48. The inner wings are supported on wing wheel assemblies 42 adjacent the outer ends 48 of the inner wings 40. Outboard of the inner wings are left and right middle or second wings 50. The middle wings 50 have inner and outer ends 54 and 58 respectively and are pivotally attached at the inner ends 54 to the outer ends 48 of the inner wings for rotation about middle wing axes 56. The middle wings do not have supporting wheel assemblies.

Outboard of the middle wings are left and right rigid wings 70. The rigid wings 70 have inner ends 74 and outer ends 78. The rigid wings are pivotally coupled to the outer ends of the middle wings for rotation about rigid wing axes 76. The rigid wings are supported at the outer ends by wing wheel assemblies 72. The rigid wings are coupled to the middle wings by locking hinge assemblies 100 described in detail below. The locking hinge assemblies hold the rigid wings in place to prevent rotation about the rigid wing axes 76 when the implement is in the field use position shown in FIGS. 1 and 5. The middle and rigid wings act as a single unit with the wing wheel assemblies 72 supporting both the middle and rigid wings.

Outboard of the rigid wings are left and right outer wings 80. The outer wings have inner and outer ends 84 and 88 respectively and are pivotally attached at their inner ends to the outer ends of the rigid wings 70. The outer wings rotate about outer wing axes 86. Wing wheel assemblies 82 support the outer wings at the outer ends 88 thereof.

Figure 2:
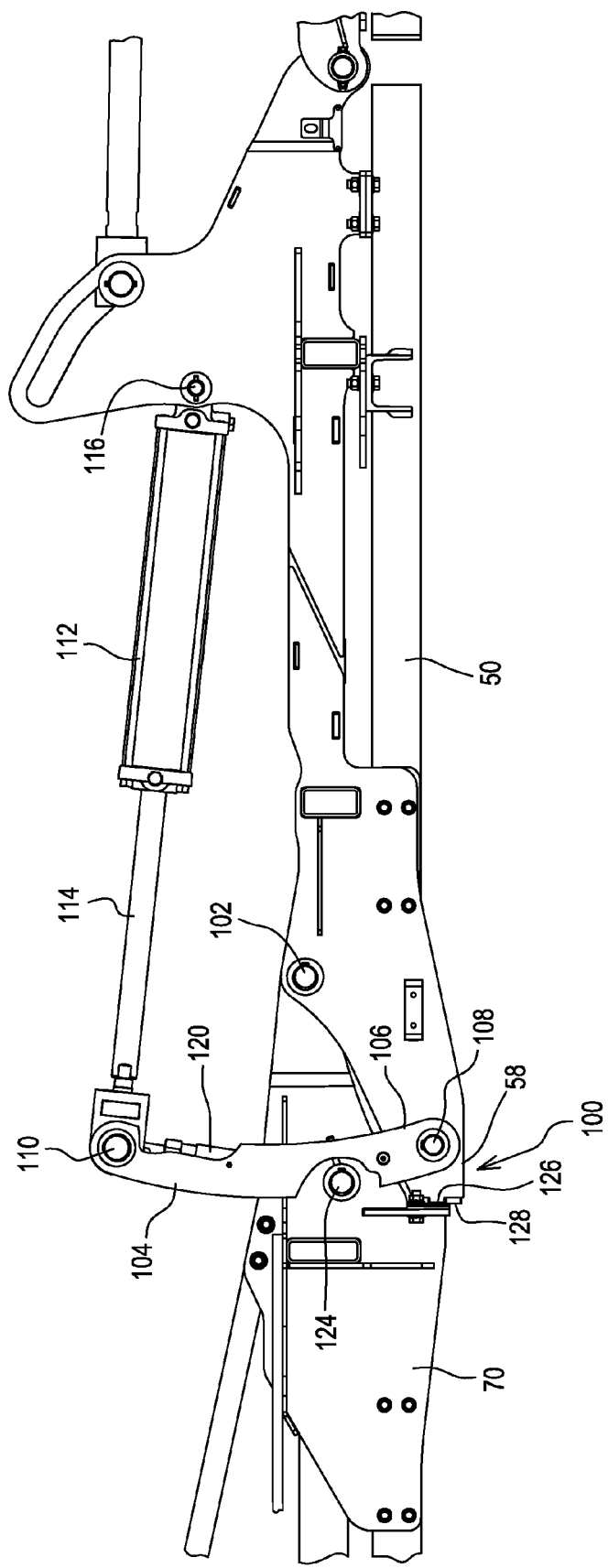
FIG. 2 is a side view of a locking hinge assembly between two of the wings with the hinge assembly in the locked field use position.
Figure 3:
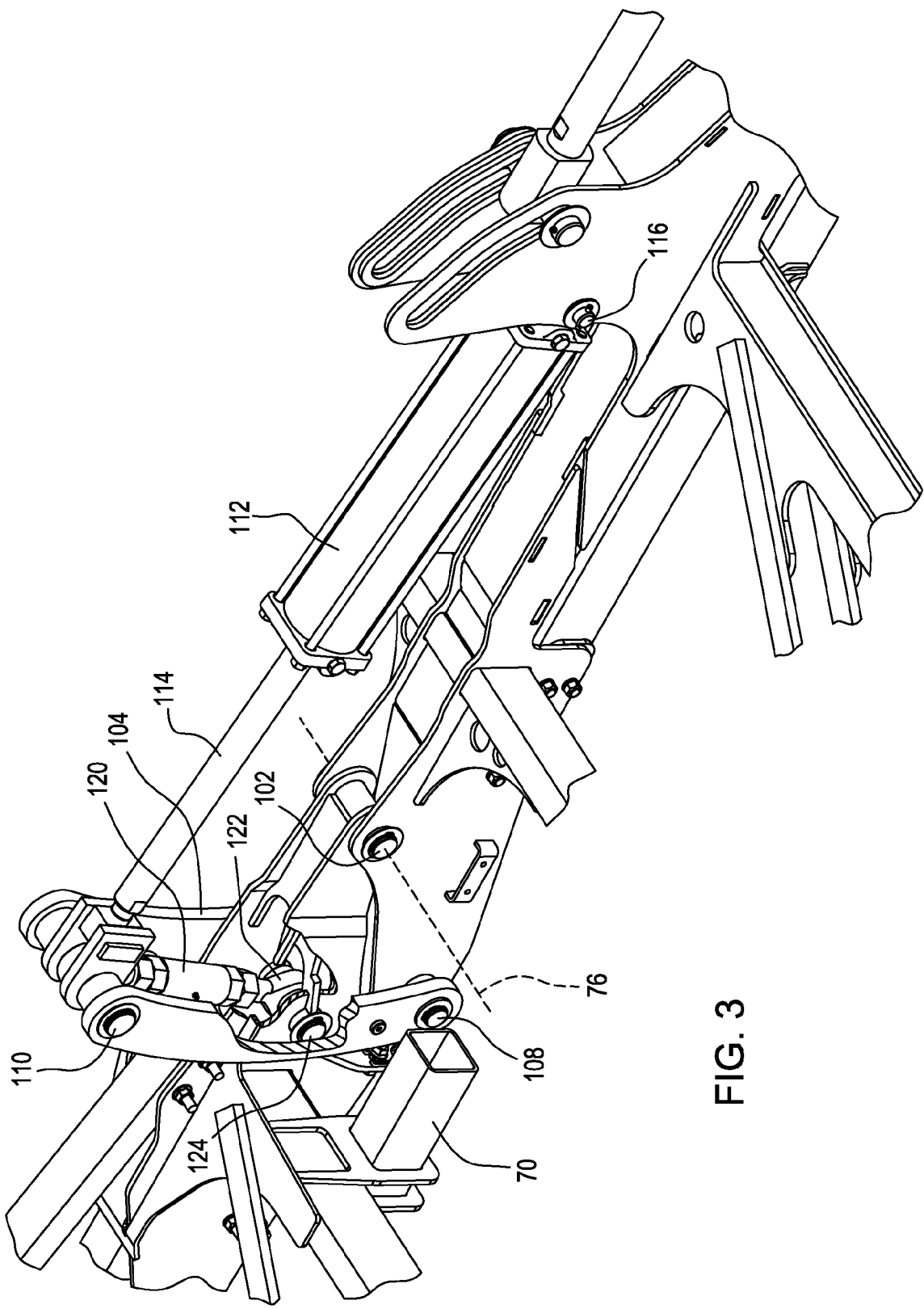
FIG. 3 is a perspective view of the locking hinge assembly of FIG. 2.
Figure 4:
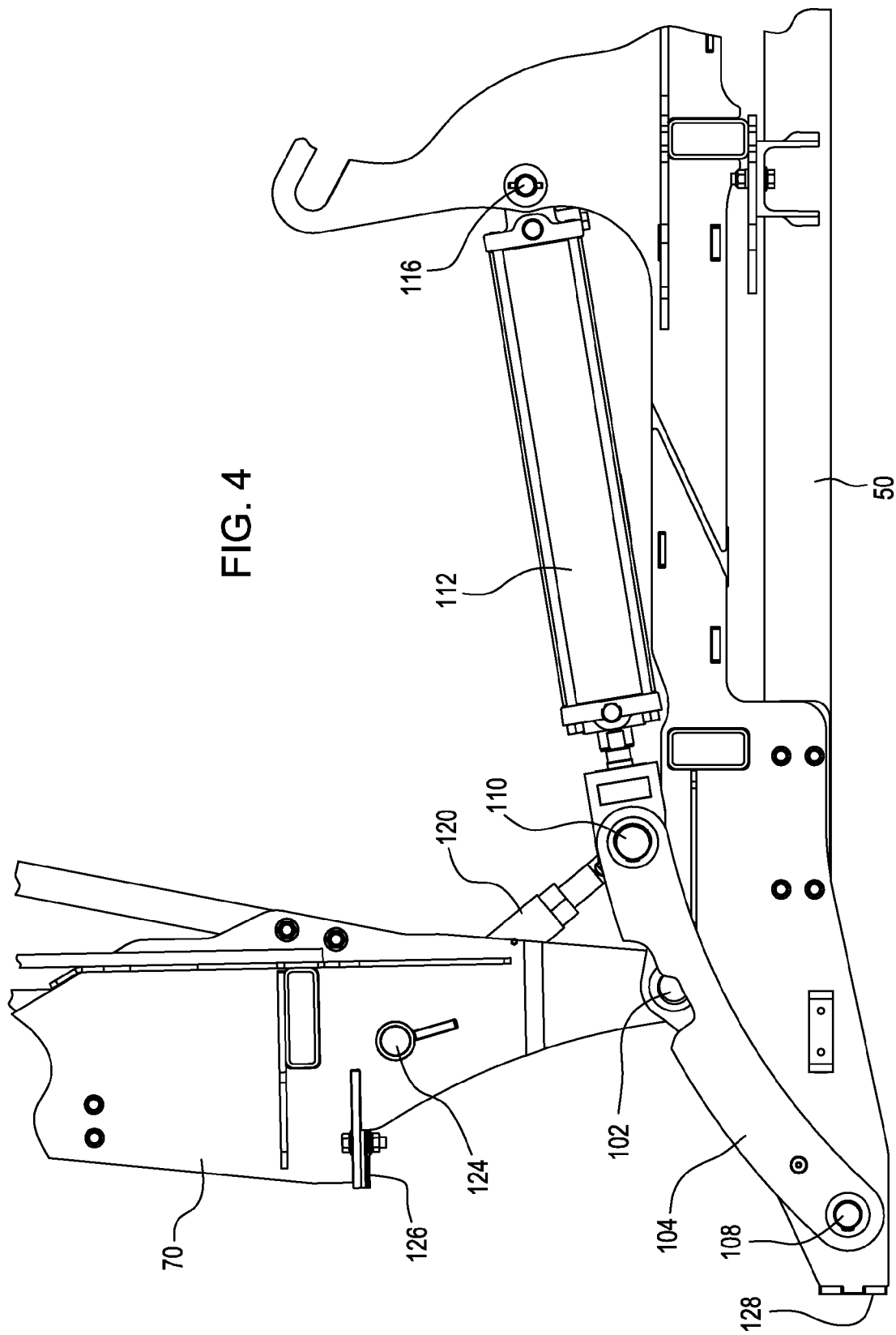
FIG. 4 is a side view of the locking hinge assembly of FIG. 2 with the hinge unlocked and in a folded position.

The locking hinge assemblies 100 are described with reference to FIGS. 2-4. A pivot joint 102 couples the rigid wing 70 to the middle wing 50 and defines the rigid wing axes 76. A guide arm 104 has one end 106 coupled to the middle wing at pivot joint 108. The other end of the guide arm 104 is coupled to the rod 114 of a hydraulic cylinder 112 by pivot joint 110. The cap end of the cylinder 112 is attached to the middle wing at pivot joint 116. A connecting arm 120 is also attached to the rod 114 and the guide arm 104 at the pivot join 110. The opposite end 122 of the connecting arm 120 is coupled to the rigid wing 70 at a pivot joint 124. As the rod 114 is retracted, the path of the pivot joint 110 is controlled by the guide arm 104. The connecting arm moves along with the guide arm 104. This causes the rigid wing to rotate about the rigid wing axes 76, to raise the rigid wing from the field use position shown in FIGS. 2 and 3 to the folded transport position shown in FIG. 4. In the field use position shown in FIG. 2, pressure in the cylinder 112 holds the rigid wing in place with the surface 126 of the rigid wing firmly butted against the surface 128 of the middle wing.

Figure 5:
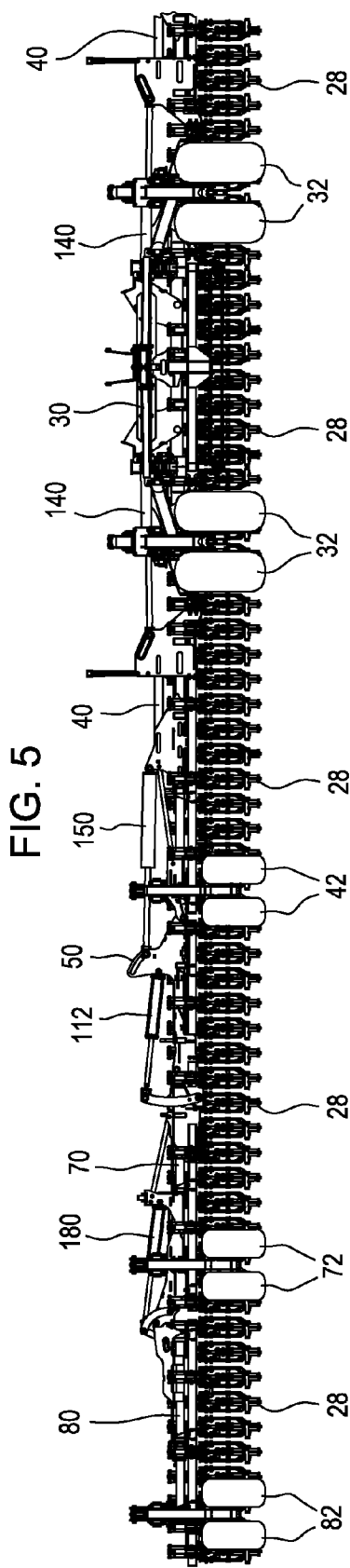
FIG. 5 is a rear view of the frame of FIG. 1 showing the left side in the field use position.

Implement 20 is shown in FIGS. 1 and 5 in a field use position in which the main section of the frame and the wings are generally aligned with one another in a horizontal orientation. While shown as being generally horizontal, this is when placed on level ground. The inner wings are allowed a certain amount of rotation about the inner wing axes 46 to allow the inner wings to follow the ground contours. Likewise, the joined middle and rigid wings are allowed some rotation about the middle wing axes 56 while the outer wings are allowed to rotate about the outer wings axes 86, all to follow the ground contours.

A plurality of hydraulic cylinders are provided to fold the implement 20 from the field use position of FIGS. 1 and 5 to a folded transport position shown in 9. The folding sequence is described below. Hydraulic cylinders 140 are connected to the frame main section 30 and the inner wings 40. The cylinder rods of the cylinders 140 are coupled to brackets 142 on the inner wings in a slot 144. The slotted connection of the rod to the bracket allows for limited rotation of the inner wings about the inner wing axes as the implement is moved over the ground to enable the implement to follow the ground contours. Similarly, hydraulic cylinders 150 are connected to the inners wings 40 and the middle wings 50. Hydraulic cylinders 180 are connected to the rigid wings and the outer wings. Slotted connections of the rods of cylinders 150 and 180 allow for limited movement of the wings as described above enabling the wings to follow the ground contours.

Figure 6:
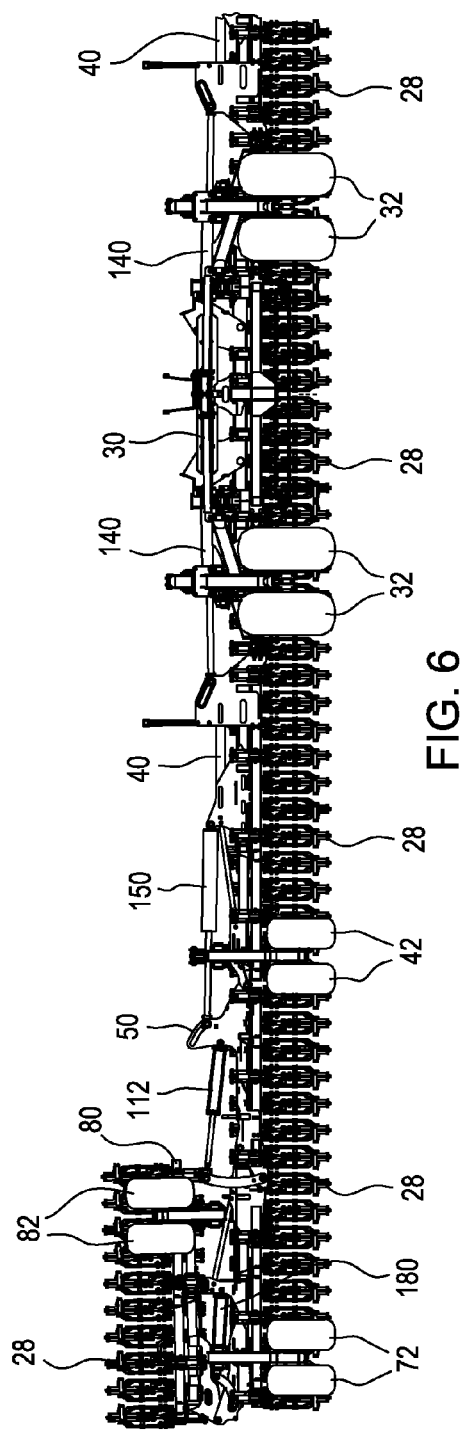
FIGS. 6-8 are rear views of the frame, like FIG. 5, showing the left side the frame illustrating the folding sequence.
Figure 7:
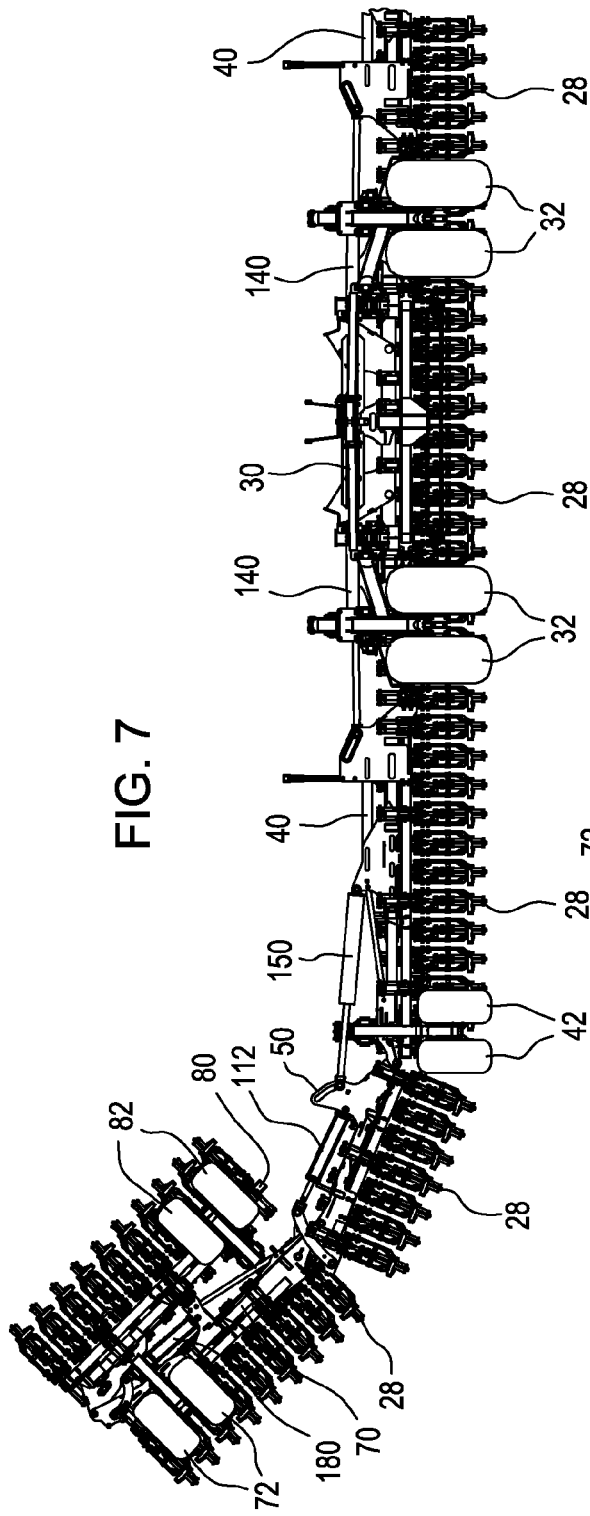
Figure 8:
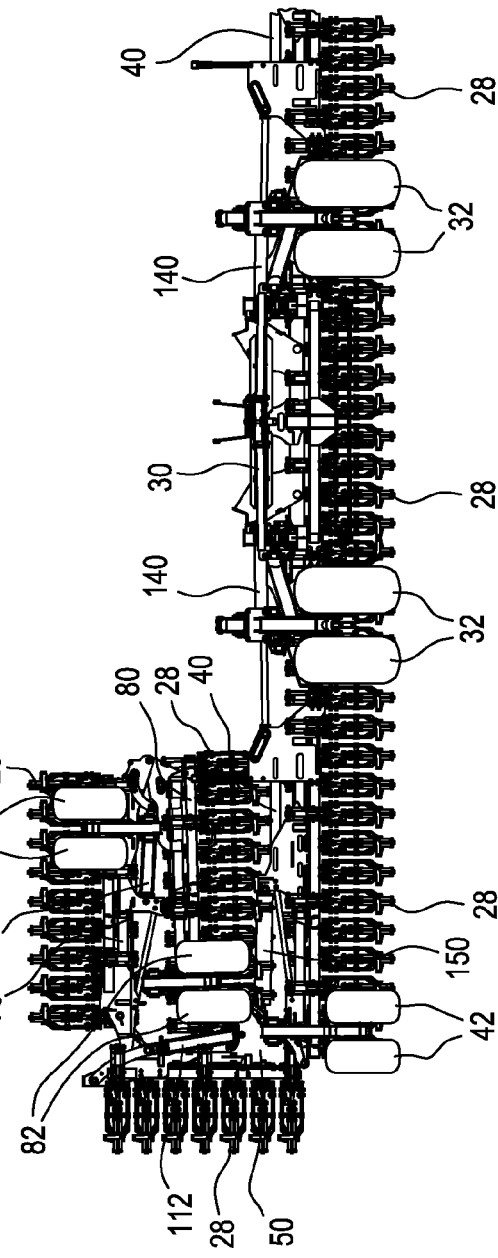

Folding of the implement 20 from the field use position to the folded transport position is accomplished as follows. First the frame is lowered relative to the wheel assemblies. The fold sequence is then initiated and the frame is raised to its uppermost position. The ground working tools 28 are then retracted if they are of a retractable design. Folding begins by first actuating cylinders 180 to rotate the outer wings 80 about the outer wings axes 86. The outer wings are rotated approximately 180 degrees to a position in which the outer wings overlie the rigid wing as shown in FIG. 6. The outer wing wheel assemblies 82 are then retracted relative to the frame, that is, the wheel assemblies are moved to the position relative to the frame they are in when the frame is lowered in the field use position.

The middle wings 50 and the rigid wings 70 are raised together as a fixed unit with the hinge assemblies 100 still locked. The middle and rigid wings are raised by actuation of the cylinders 150 and are raised together until the middle wings 50 are raise to about a twenty degree angle. Before doing so, the cylinders 140 are retracted to apply a lifting force on the inner wings 40. The lifting force is not sufficient to lift the inner wings but to transfer weight from the inner wings to the center section 30. This improves stability of the frame during folding and also reduces the load on the inner wing wheel assemblies 42. This weight transfer is described in more detail below. After the middle wings are raised twenty degrees, the locking hinges 100 are released by operation of the cylinders 112 and the rigid wings are rotated about the axes 76 about 90 degrees to extend at approximately a right angle relative to the middle wings. The cylinders 150 are further actuated to rotate the middle wings 50 a total of approximately 90 degrees about the middle wing axes 56 to the position shown in FIG. 8. Now the middle wings are extending upwardly with the rigid wings extending laterally above the inner wings and with the outer wings between the inner and rigid wings. The rigid wing wheel assemblies 72 are then retracted relative to the frame.

Figure 9:
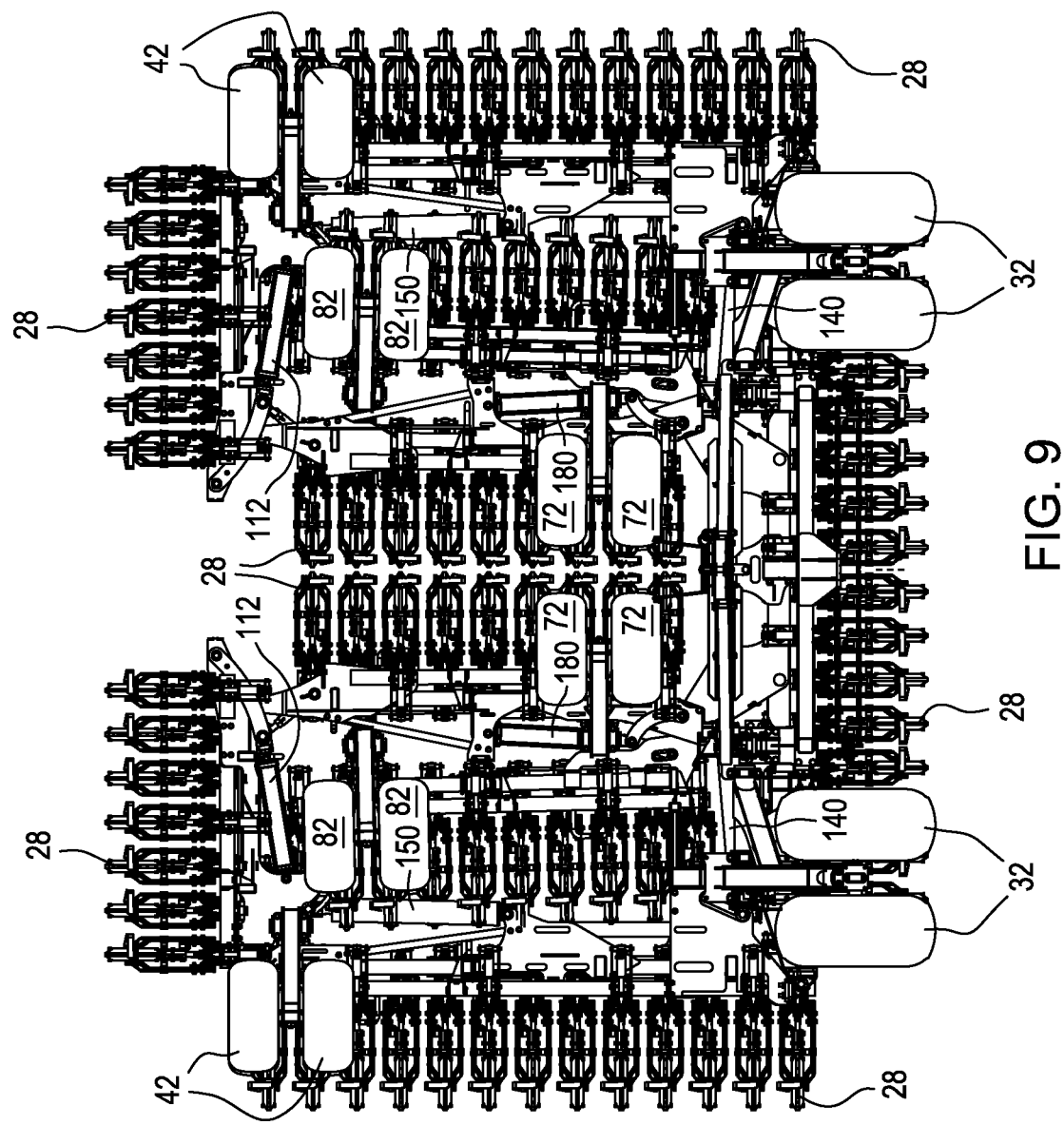
FIG. 9 is a rear view of the frame showing the entire frame in the folded transport position.

The next step in the folding sequence is the actuation of the cylinders 140 to now rotate the inner wings approximately 90 degrees to the folded transport position shown in FIG. 9. The inner wings wheel assemblies 42 are then retracted. The inner wings are now extending upwardly, the middle wings extend laterally inwardly, the rigid wings extend downwardly and the outer wings extend upwardly beneath the middle wings and between the inner and rigid wings. During the folding operation, the outer wings are rotated a total of approximately 450 degrees from the field use position to the folded transport position. The rigid wings rotate 270 degrees from the field use position to the folded transport position. The middle wings rotate 180 degrees from the field use position to the folded transport position while the inner wings only rotate 90 degrees from the field use position to the folded transport position.

To fold the implement, the locking hinge joint 100 is unlocked allowing the rigid wings to rotate relative to the middle wings about the rigid wing axes 76. The implement frame 22 operates as a seven section frame in the field use position and as a nine section frame in the folded transport position. This enables the implement to be folded into a smaller configuration for transport than if it remained a seven section frame. As noted previously, the middle wings do not have wheel assemblies connected thereto. The wing wheel assemblies are only mounted to the wings that are oriented upright in the folded transport position. This helps to minimize the overall height of the implement in the folded transport position as there are no wheel assemblies extending upwardly from the middle wings. Wing wheel assemblies 42 on the inner wings extend laterally and depending on the size of the tools and wheel assemblies may increase the transport width of the implement 30 but not the height.

The implement frame, by having seven section in the field use position and nine sections in the folded transport position enables a frame to be constructed that is greater than 27 meters in width in the field use position but is folded to a transport position that is less than eight meters in width and less than six meters in height. The implement shown has a 96 foot width in the use position and a transport position width of 23 feet and height of 18 feet. This is slightly smaller than the transport dimensions of the 75 foot wide frame disclosed in U.S. Pat. No. 7,497,269. This results in a machine with a significantly greater are covered per pass in the field compared to the machine of the '269 patent without any increase in the transport dimensions.

Figure 10:
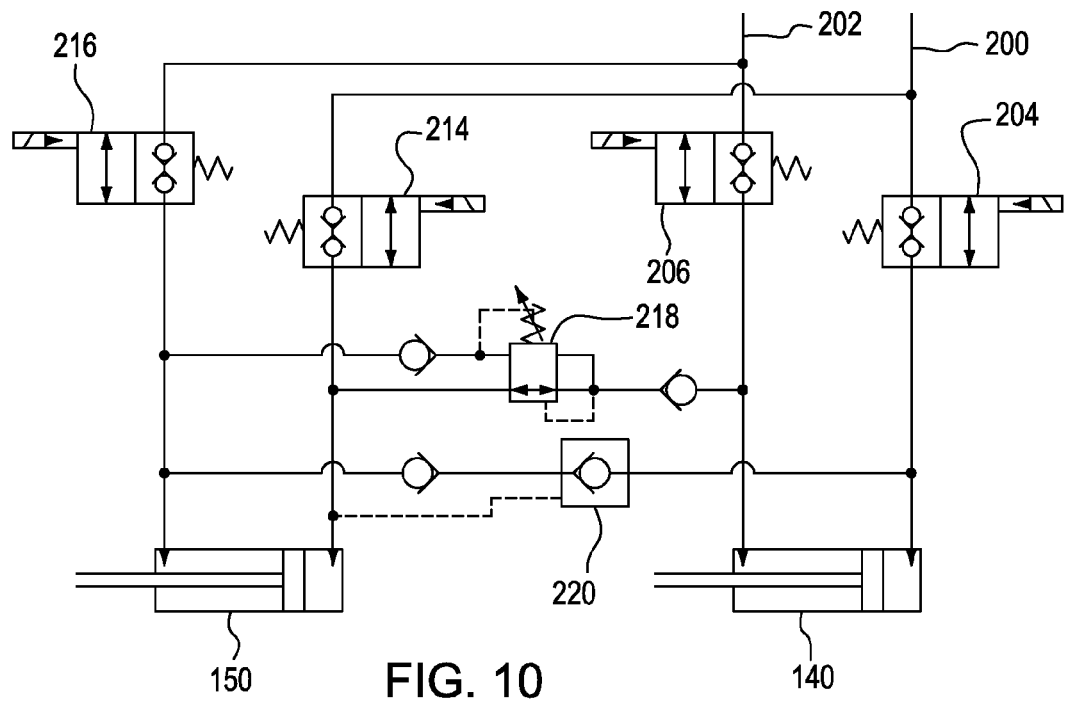
FIG. 10 is a hydraulic schematic of the weight transfer system for frame folding.

A portion of the hydraulic system of the implement 20 is shown in FIG. 10. Due to the number of wings on the implement, when rotating the middle wings 50 between the folded transport position and the field use position, it is beneficial for stability of the implement and to reduce the load on the inner wing wheel assemblies 42, to transfer weight from the inner wings 40 to the main section 30. The weight transfer was mentioned above in connection with the folding of the frame. The weight transfer is accomplished by the hydraulic circuit shown in FIG. 10. Hydraulic lines 200 and 202 connect to the tractor hydraulic system to delivery oil to the inner wing cylinders 140 and to the middle wing cylinders 150. Valves 204 and 206 control the flow of oil to and from the inner wing cylinders 140. Valves 214 and 216 control the flow of oil to and from the middle wing cylinders 150. To unfold the frame 22 from the folded transport position to the field use position, the inner wing cylinders are extended first by opening the valves 204, 206. Oil is supplied to the cylinders 140 by the line 200 and returned from the cylinder by the line 202. This rotates the inner wings about the inner wing axes 46 from the upright transport position in FIG. 9 to the generally horizontal use position FIG. 8. The valves 204 and 206 are then closed. The valves 214 and 216 are then opened to extend the middle wing cylinders 150. While doing so, oil pressure is delivered through the pressure regulating valve 218 to the rod end of the inner wing cylinders 140 while the pilot operated check valve 220 is opened to allow oil to flow from the cap ends of the inner wing cylinders. This retracts the rods of the inner wing cylinders 140 to the end of the slots 144. The pressure in the cylinders 140 creates a lifting force on the inner wings but the pressure is regulated by the valve 218 to not be sufficient to lift the inner wings. This transfers weight from the inner wings to the main section. The added weight on the main section keeps the implement stable during unfolding of the middle wings and reduces the load carried by the inner wing wheel assemblies 42.

Figure 10A:
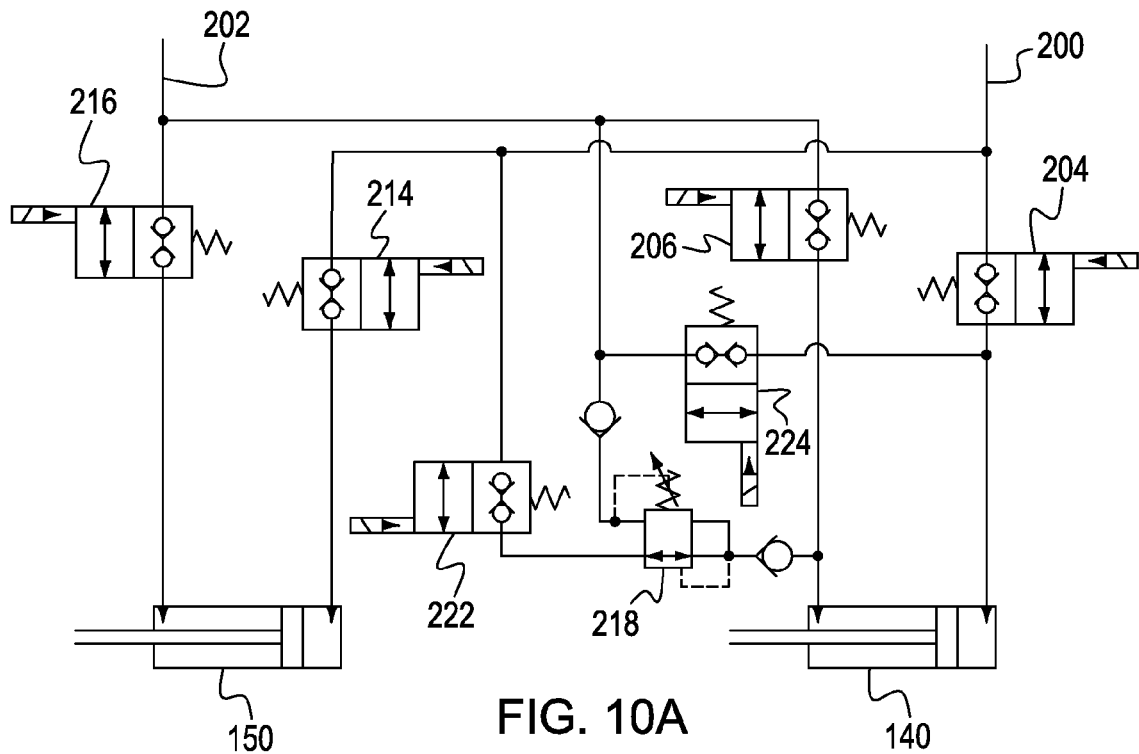
FIG. 10A is an alternative hydraulic schematic for the frame weight transfer system.

FIG. 10A shows an alternative hydraulic system for accomplishing the weight transfer. Here, the system is electro-hydraulically controlled with the used of solenoid controlled valves 222 and 224 controlling the oil flow back to the inner wing cylinders 140 for weight transfer.

Weight transfer to the main section 30 is also beneficial during the folding operation. This is accomplished by opening all of the valves 204, 206, 214, 216 and supplying oil through the line 202 and returning oil through the line 200. The cylinder rods are all retracted until they reach the ends of the slots. The pressure in the inner wing cylinders 140 pulls on the inner wings and transfers weight to the main section. The pressure needed to actually lift the inner wings is greater than the pressure needed to lift the middles wings such that the middle wing cylinders 150 will continue to retract while the inner wing cylinders held stationary. Once the middle wings are fully rotated, the hydraulic pressure will increase until it is sufficient to retract the rods of the inner wing cylinders 140 and thereby lift the inner wings. While it is preferred to apply a lifting force on the inner wings for weight transfer without actually lifting the inner wings, it is possible to slightly lift the inner wings before folding the middle wings.

The need for weight transfer to the main section during folding is due to the large weight being moved when the middle wings are being folded. Weight transfer is not limited to a nine section frame but can be used with other frame configurations as well. The nine section frame, due to its size, has a large weight to be lifted when folding the middle wings. The weight transfer is beneficial. However, weight transfer may still be used with a frame having fewer than nine sections if the frame is sufficiently heavy.

When extending the rods of the hydraulic cylinders, more oil is introduced in the cap end of the cylinder than is given up from the rod end of the cylinder. The difference in oil volume is the physical volume of the rod itself. With the implement 20 having many large cylinders to fold the frame, the additional volume of oil going into the cap end of the cylinder than coming out of the rod end to extend all of the cylinders to unfold the implement may exceed the amount of oil available from the tractor hydraulic system reservoir.

Figure 11:
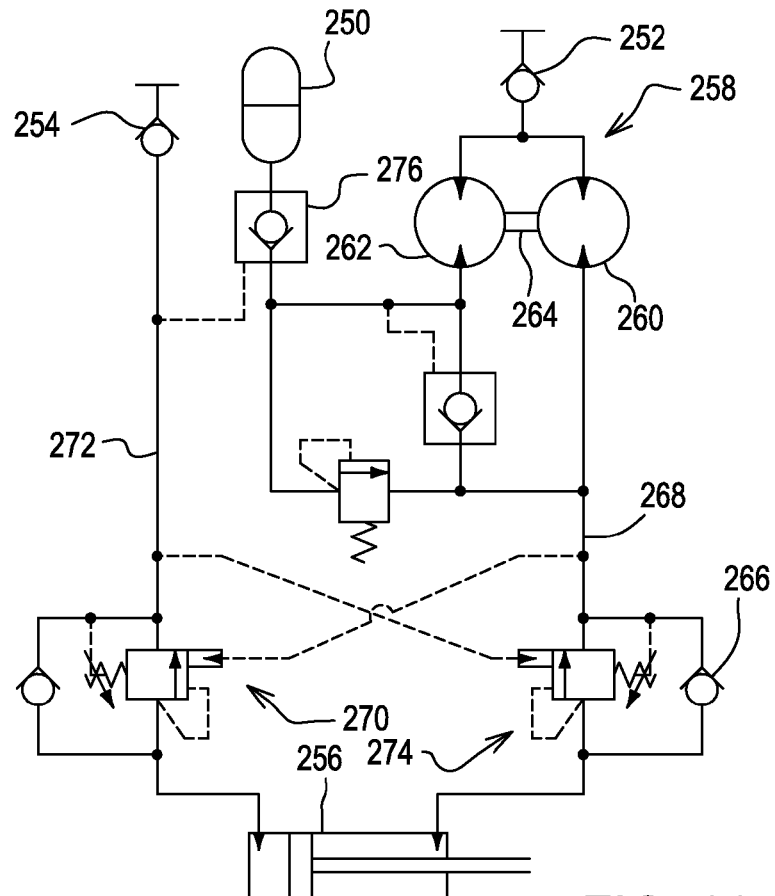
FIG. 11 is a hydraulic schematic of the oil exchange reduction system for reducing the amount of oil exchanged from the tractor when extending the cylinder rods to un-fold the frame.

To avoid taking too much oil from the tractor reservoir, the implement hydraulic system includes one or more accumulators 250 (FIG. 11). When the rods are retracted, the accumulators store a portion of the oil coming from the tractor. This results in the amount of oil coming from the tractor being more equal to the amount of oil being returned to the tractor from the cap end of the cylinders, thereby reducing the change in the oil level in the tractor reservoir. Later, when the rods are extended and more oil flows into the cap end of the cylinders than flows from the rod end, the accumulators return oil to the tractor. The oil flow from the rod ends of the cylinders combined with the oil from the accumulators more closely matches the oil flow into the cap end of the cylinders. This again reduces the magnitude of change in the reservoir oil level. The result is that the changes in oil level in the tractor reservoir are within acceptable limits.

The attached schematic shows the implement hydraulic system. The tractor selective control valves (SCV) 252 and 254 control the oil flow in and out of the implement. To retract the rods of the cylinders, shown here as one cylinder 256, oil flows in from the tractor SCV 252. The oil flow is divided by a mechanical flow divider 258. In this embodiment, the divider 258 is comprised of two gear motors 260, 262 tied together by a shaft 264. The displacements of the two motors are fixed and thereby determine the ratio of the oil flow split. For example, the motors may be sized to split the oil flow 85/15. Any desired ratios can be used. In this example, fifteen percent of the oil flows to the accumulator 250 while eighty five percent flows to the rod end of the cylinder 256 through the check valve 266. The pressure in the line 268 opens the pilot operated valve 270 in the line 272 connected to the cap end of the cylinder 256. This allows oil to flow back to the tractor through the SCV 254 to the tractor reservoir. Since a portion of the oil from the tractor is diverted to the accumulator, more oil is needed to retract the cylinders such that the oil from the tractor is more equal to the oil returned to the tractor then if there was no accumulator.

To extend the rod, oil flows in through the SCV 254. Pressure in the line 272 opens the pilot operated valve 274 allowing oil on the rod side of the cylinder to flow back through the flow divider to the tractor. Pilot pressure in the line 272 opens check valve 276 thereby allowing oil in the accumulator to also flow back through the divider to the tractor. This produces a more equal flow of oil to and from the tractor so that the net change in the reservoir oil level is within acceptable limits. Other arrangements of the hydraulic system components can be used to accomplish the same function.

Figure 12:
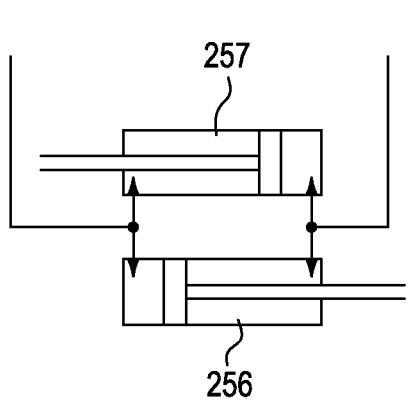
FIG. 12 is a hydraulic schematic of an alternative embodiment of the oil exchange reduction system.
Figure 12A:
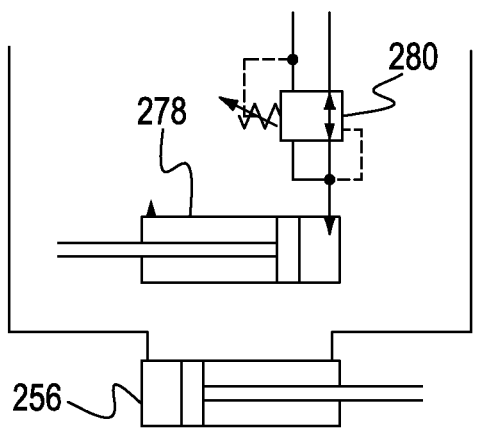
FIG. 12A is a hydraulic schematic of a further alternative embodiment of the oil exchange reduction system.

One alternative hydraulic system arrangement is to add dummy cylinders on the implement that operate in the opposite direction so that as the rod of the active cylinder 256 is retracted, the rod on the dummy cylinder is extended. See FIG. 12. There, as the rod of the active cylinder 256 is retracted, the rod of the dummy cylinder 257 is extended. In this manner, the dummy cylinder acts as the accumulator with no need for a flow splitter. As one cylinder takes in more oil than it discharges, the other cylinder discharges more oil than it takes in. In such a system, there would be no change in the tractor reservoir oil level if there is a dummy cylinder for each active cylinder. The dummy cylinders must be anchored on each end to structure to ensure they move with the active cylinders and not extend or retract without the appropriate oil pressure. FIG. 12A shows an alternative schematic for using dummy cylinders as the reservoir. Here, the dummy cylinder 278 is vented to atmosphere with the pressure controlled by the pressure regulating valve 280. Other types of flow splitters may be used other than the dual motors shown. The above system to reduce the amount of oil exchanged with the tractor is needed as the implement 20 is intended to be attached to a separate prime mover such as a tractor. This ensures maximum compatibility of the implement with a broad range of tractors. If the frame is part of a self-propelled vehicle, the vehicle hydraulic system would have a reservoir sized to have sufficient capacity to extend all the hydraulic cylinders.

The wheel assemblies are coupled to their respective frame section by pivot arms rotatably mounted to the main section or wings to enable the frame to be raised and lowered relative to the ground. The pivot arm 300 is mounted to the main section by a pivot joint 302 which defines an axis 304. The main wheel assembly 32 is attached to the pivot arm. If the pivot arm 300 is rotated clockwise as viewed in FIG. 13, the main section 30 of the frame is raised upward. A linkage, not shown, connects the pivot arm 300 on the front wheel assembly 32 to the pivot arm 303 on the rear wheel assembly so that the front and rear of the frame is raised and lowered together. Such linkages are generally known.

The frame is raised at the end of each pass in a field to turn the implement around. Once turned, the frame is lowered to reengage the tools in the ground. The frame is also raised to support the implement off the ground when transported to and from the field. When raised in the folded transport position, all the weight of the implement is carried by the main wheel assemblies 32 on the frame main section 30. To carry the larger load, the main wheel assemblies 32 are larger than the wing wheel assemblies. Likewise, the hydraulic cylinders necessary to move the pivot arms 300 will be larger than the cylinders to pivot the arms carrying the wing wheel assemblies. However, with the larger the cylinder, more oil needs to flow into and out of the cylinder to extend and retract the cylinder rod. Using a large cylinder on the main wheel assemblies will by necessity require longer raise and lower times when making turns at the end of each pass even though in the field use position the weight on the frame main section wheel assemblies is lower. The longer lift and lower cycle time decreases machine productivity. To avoid the increased cycle time, the main wheel assemblies 32 are provided with two hydraulic cylinders for lifting. One cylinder 306 is sized to lift the main section when in the field use position and only the weight of the main section needs to be supported by the cylinder 306. A second helper cylinder 308 is provided to increase the load carrying ability to support the load on the main wheel assemblies when the frame is in the folded transport position.

Cylinder 308 is connected to the pivot arm 300 through a swing arm 310, pivotally mounted to the pivot arm 300 by a joint 312. The swing arm 310 allows the pivot arm 300 to move only by the operation of the cylinder 306 when desired. However, when it is desired to use both cylinders 306 and 308 to raise the frame, the swing arm 310 bears against the tube 314 fixed to the pivot arm 300 to rotate the pivot arm and raise the frame.

A hydraulic schematic for operating the cylinders 306 and 308 is shown in FIG. 16. The main valve 320 opens to extend the rod of main frame cylinder 306 and the wing cylinders to raise the frame. A second valve 322 controls the operation of the helper cylinder 308. With both valves open, both cylinders are actuated. With only the valve 320 open, only the valve 306 is actuated. The valve 322 is opened when the fold sequence is initiated with the frame in the lowered position. Initiation of frame folding is mentioned above in the description of the fold sequence. Then, when the frame is raised, both cylinders 306 and 308 are actuated to lift the frame. This places the swing arm 310 in contact with the tube 314 when lifting the frame.

An alternative arrangement of the "helper lift cylinder" is shown in FIG. 17. This arrangement only requires a single hydraulic cylinder 354 at each of the two front wheel assemblies to raise the main section of the frame 30. Oil is supplied and returned through lines 350, 352 connected to a selective control valve (SCV) of the tractor. To extend the rod of lift cylinder 354, the valve 356 is opened, allowing oil to flow from the rod end of the cylinder and oil to flow in the cap end to extend the rod. This is used when lifting the frame for folding. In the field, however, when lifting and lowering the frame for turns, the recirculation valve 358 is opened and the valve 356 is closed. This allows oil to flow from the rod end of cylinder 354 to the cap end when lifting. The only oil needed from the tractor through the line 350 is the oil for the volume of the rod. Thus, the time needed to lift the frame is reduced as only a small amount of oil is needed. When lowering the frame, valve 356 remains closed and valve 358 is opened. Oil flows from the cap end through the valve 358 to the rod end. The extra oil, (the volume of the rod) is returned to the tractor through the line 350.

While this alternative circuit for reduced raise and lower cycle time is shown with only one lift cylinder 354, two smaller cylinders can be arranged in the circuit in parallel in place of one large cylinder. Depending on the particular cylinder sizes, two smaller cylinders may be less expensive than one large cylinder. The cylinders 306, 308 of FIG. 16 and associated mounting structure constitute a hydraulic actuator assembly. Likewise, the cylinder 354 of FIG. 17 constitutes a hydraulic actuator assembly.

The hydraulic systems, as described above, operate the hydraulic actuator assemblies in first and second modes. In the first mode, the hydraulic actuator assemblies move the pivot arms at a first speed. In the second mode, the hydraulic actuator assemblies move the pivot arms at a second speed. With the embodiment of the hydraulic system as shown in FIG. 16, the first mode is with only the valve 320 open and the cylinder 306 operating at a faster speed. In the second mode, both the valves 320 and 322 are opened and both cylinders 306, 308 are operated at a second, slower speed. With the embodiment of the hydraulic system shown in FIG. 17, the first mode with the faster speed is with the valve 358 open and the valve 356 closed. The second, slower speed mode is with the valve 358 closed and the valve 356 open.

Having described the implement, it will become apparent that various modifications can be made without departing from the scope as defined in the accompanying claims.

What is claimed is:

1. An implement comprising:
   a frame having a main section with left and right sides relative to a travel direction, the frame having left and right first wings having inner ends pivotally attached to the main section at the left and right sides thereof; each first wing being pivotal about a respective first wing axis to pivot between a field use position in which the first wings extend laterally generally in line with the main section to a folded transport position in which the first wings are raised from the ground;
   main wheel assemblies coupled to the frame main section and wing wheel assemblies coupled to the first wings, the main and wing wheel assemblies both supporting the frame for movement along the ground in the travel direction when in the field use position, the main wheel assemblies and the wing wheel assemblies each being coupled to the frame by pivot arms to enable the frame to be raised and lowered relative to the wheel assemblies; and
   an implement hydraulic system having hydraulic actuator assemblies to move the pivot arms to raise and lower the frame main section, the hydraulic system operable in first and second modes, in the first mode, the hydraulic system operating the actuator assemblies to provide sufficient force to the pivot arms on the frame main section to lift the weight of the frame main section and in the second mode, the hydraulic system operating the actuator assemblies to provide sufficient force to the pivot arms on the frame main section to lift the weight of the entire frame;
   wherein the actuator assemblies comprise first and second hydraulic cylinders and the hydraulic system is configured to operate only the first cylinder in the first mode and to operate both the first and second cylinders in the second mode thereby providing more force to the pivot arms in the second mode than in the first mode.

2. The implement of claim 1 wherein the first hydraulic cylinder is sized to support the frame main section when the implement is in the field use position and the second hydraulic cylinder is sized to support the frame main section together with the first hydraulic cylinder when the frame is in the folded transport position.

3. The implement of claim 1 further comprising a first hydraulic control valve controlling the flow of oil to the first hydraulic cylinder and to a second hydraulic control valve operable to receive oil from the first hydraulic control valve and to control the flow of oil to the second hydraulic cylinder.

\* \* \* \* \*